United States Patent
Lee et al.

(10) Patent No.: US 7,843,524 B2
(45) Date of Patent: Nov. 30, 2010

(54) MOLD FRAME AND LIQUID CRYSTAL DISPLAY HAVING THE SAME

(75) Inventors: Yong Woo Lee, Suwon-Si (KR); An Na Ryu, Asan-Si (KR); Sung Wook Kang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 384 days.

(21) Appl. No.: 11/779,343

(22) Filed: Jul. 18, 2007

(65) Prior Publication Data

US 2008/0018825 A1    Jan. 24, 2008

(30) Foreign Application Priority Data

Jul. 18, 2006    (KR) ...................... 10-2006-0066724

(51) Int. Cl.
*G02F 1/1333* (2006.01)
*F21V 7/04* (2006.01)

(52) U.S. Cl. ......................................... 349/58; 362/634

(58) Field of Classification Search .................. 349/65, 349/58; 362/634
See application file for complete search history.

(56) References Cited

U.S. PATENT DOCUMENTS

| | | | |
|---|---|---|---|
| 6,309,081 B1 * | 10/2001 | Furihata | 362/634 |
| 6,722,773 B2 | 4/2004 | Tsai et al. | |
| 6,762,806 B1 * | 7/2004 | Matsuo et al. | 349/58 |
| 6,834,974 B2 * | 12/2004 | Lee et al. | 362/632 |
| 6,867,827 B2 * | 3/2005 | Cha et al. | 349/65 |
| 6,960,002 B2 | 11/2005 | Tsai | |
| 6,979,115 B2 * | 12/2005 | Ohizumi et al. | 362/634 |
| 2002/0126237 A1 * | 9/2002 | Kasuga | 349/58 |
| 2003/0235052 A1 * | 12/2003 | Lee et al. | 362/329 |
| 2004/0228111 A1 | 11/2004 | Kuo et al. | |
| 2005/0265043 A1 | 12/2005 | Tseng et al. | |
| 2005/0276076 A1 * | 12/2005 | Shin | 362/633 |
| 2006/0034090 A1 | 2/2006 | Chen et al. | |
| 2006/0050500 A1 | 3/2006 | Chang et al. | |
| 2006/0202622 A1 * | 9/2006 | Lung et al. | 313/623 |
| 2007/0291509 A1 * | 12/2007 | Kang | 362/614 |

FOREIGN PATENT DOCUMENTS

| | | | |
|---|---|---|---|
| JP | 07281031 A | * | 10/1995 |
| JP | 2004348150 | | 12/2004 |
| JP | 2006100288 | | 4/2006 |
| KR | 1020010046232 | | 6/2001 |
| KR | 1020040000776 | | 1/2004 |
| KR | 1020050000957 | | 1/2005 |
| KR | 1020050026779 | | 3/2005 |
| KR | 1020050070387 | | 7/2005 |
| KR | 1020060007700 | | 1/2006 |

* cited by examiner

*Primary Examiner*—Michelle R Connelly Cushwa
(74) *Attorney, Agent, or Firm*—Cantor Colburn LLP

(57) ABSTRACT

A mold frame formed integrally with a lamp holder for holding a lamp and a LCD having the mold frame. The mold frame includes a receiving unit provided with a predetermined receiving space therein, and a pair of lamp holders formed on a side of the receiving unit to hold a lamp. Each of the lamp holders includes a contact surface reducing member reducing a contact surface between the lamp and the lamp holder. The receiving unit and the pair of lamp holders are integrally formed.

21 Claims, 8 Drawing Sheets

MOLD FRAME AND LIQUID CRYSTAL DISPLAY HAVING THE SAME

This application claims priority to Korean Patent application No. 2006-0066724, filed Jul. 18, 2006, and all the benefits accruing therefrom under 35 U.S.C.§119, the contents of which are herein incorporated by reference in its entirety.

BACKGROUND OF THE INVENTION

1. Field of Invention

The present invention relates to a mold frame and a liquid crystal display ("LCD") having the mold frame, and more particularly, to a mold frame formed integrally with a lamp holder for holding a lamp, and a LCD having the mold frame.

2. Description of the Prior Art

The application range of a liquid crystal display ("LCD") has been extended because of its good lightweight, thin, low-power drive, full color and high resolution characteristics. Such an LCD has been used in a computer, a notebook, PDA, a telephone, TV, an audio/video device, and the like. The LCD is used to adjust an amount of light transmitted in accordance with image signals applied to a number of control switches arrayed in a matrix form and then to display desired images on an LCD panel. Since such an LCD is not self-luminescent, a light source such as a backlight is required. A lamp has been widely used as such a light source.

As the LCD becomes thinner and requires higher brightness, a quality problem concerning shock resistance and heat generated from a light source of a backlight of an LCD, i.e., a lamp has come to the front.

In a conventional LCD, a lamp holder composed of rubber material such as silicon-rubber is disposed on a mold frame in order to hold a lamp used as a light source of the backlight. The purpose of forming the lamp holder of a rubber material such as silicon-rubber is to alleviate impacts transferred to the lamp when the lamp is held or the LCD device is handled. However, when the lamp is operated in a low temperature circumstance, the heat leaked through the lamp holder contacting with the lamp causes temperature of the lamp not to be uniform, thereby causing a dark portion since mercury is locally concentrated toward a low temperature region. In addition, in a case where the lamp is operated in a high temperature condition, the heat generated from the lamp is transferred to a LCD panel through the lamp holder, thereby possibly causing deterioration of liquid crystal. In addition, as an LCD has thinner thickness and narrower rims, there is an insufficient space for making a stopper that is used for preventing floating of a light guide plate, so a metal plate has been used or protrusions were formed on the mold frame. However, such measures have a limit when the LCD has a large size, so that additional measures are required.

BRIEF SUMMARY OF THE INVENTION

An exemplary embodiment provides a mold frame in which a lamp holder is integrally formed, which may reduce the costs by reducing unnecessary parts, improve impact resistance, and reduce or effectively prevent the local concentration of mercury in a lamp and deterioration of liquid crystal by lowering conduction of the heat generated from the lamp, and also provide a liquid crystal display having the mold frame.

In an exemplary embodiment, there is provided a mold frame including a receiving unit provided with a predetermined receiving space therein and a pair of lamp holders formed on a side of the receiving unit to hold a lamp. The receiving unit and the pair of lamp holders are integrally formed. Each of the lamp holders includes a contact surface reducing member reducing contact surface between the lamp and the lamp holder.

In an exemplary embodiment, the receiving unit includes a plurality of sidewalls and a receiving surface protruding from the plurality of sidewalls to extend inward toward the receiving space.

In an exemplary embodiment, the pair of lamp holders are formed on one of the plurality of sidewalls or on the receiving surface.

In an exemplary embodiment, the mold frame may further include a second pair of lamp holders formed on a second side of the receiving unit.

In an exemplary embodiment, each of the lamp holders includes a body, a hollow portion formed in the body and provided with a predetermined space for receiving a lamp and an opening portion formed in the body and communicating with the hollow portion.

In an exemplary embodiment, the opening portion is formed in a first sidewall of the body, wherein the first sidewall of the body faces a second sidewall of the body adjacent to the receiving space of the receiving unit.

In an exemplary embodiment, the contact surface reducing member is formed on an inner surface of the body in which the hollow portion is formed.

In an exemplary embodiment, the contact surface reducing member includes a protrusion protruding into the hollow portion from the inner surface or a recess depressed in the body from the hollow portion.

In an exemplary embodiment, the contact surface reducing member includes a plurality of dot-shaped protrusions or dot-shaped recesses formed in a predetermined pattern.

In an exemplary embodiment, the contact surface reducing member may include a plurality of linear protrusions or linear recesses arranged to be spaced from each other in a predetermined direction.

In an exemplary embodiment, the hollow portion may be formed in a cylindrical shape.

In an exemplary embodiment, the mold frame includes a plastic material with a low thermal conductivity or includes polycarbonate.

In an exemplary embodiment, there is provided a liquid crystal display including a mold frame, a lamp unit including a lamp, and a liquid crystal display panel displaying images. The mold frame includes a receiving unit provided with a predetermined receiving space therein and a pair of lamp holders formed on a side of the receiving unit to hold the lamp and the receiving unit and the pair of lamp holders are integrally formed. Each of the lamp holders includes a contact surface reducing member reducing a contact surface between the lamp and the lamp holder.

In an exemplary embodiment, the liquid crystal display may further include a light guide panel disposed in the receiving space of the mold frame, a plurality of optical sheets arranged over the light guide panel, a reflection plate disposed below the light guide panel and a receiving container coupled to the mold frame.

In an exemplary embodiment, the lamp unit further includes a lamp reflector disposed at a side of the lamp to reflect light generated from the lamp.

In an exemplary embodiment, each of the lamp holders includes a body, a hollow portion formed in the body and provided with a predetermined space for receiving a lamp and an opening portion formed in the body to communicate with the hollow portion.

In an exemplary embodiment the hollow portion is shaped corresponding to the lamp.

In an exemplary embodiment, each of the lamp holders further includes a contact surface reducing member formed on an inner surface of the body in which the hollow portion is formed.

In an exemplary embodiment, each lamp may include a lamp tube including a predetermined discharging gas and a phosphor layer, electrodes installed to both ends of the lamp tube and insulation portions surrounding the respective electrodes.

In an exemplary embodiment, the liquid crystal display may further include a second pair of lamp holders formed on a second side of the receiving unit. A lamp is disposed to each pair of the lamp holders.

In an exemplary embodiment, the liquid crystal display may further include a second pair of lamp holders. The pairs of lamp holders are formed on a same side of the receiving unit. The pairs of lamp holders are arranged vertically and a lamp is disposed in each pair of lamp holders.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Figure 1:
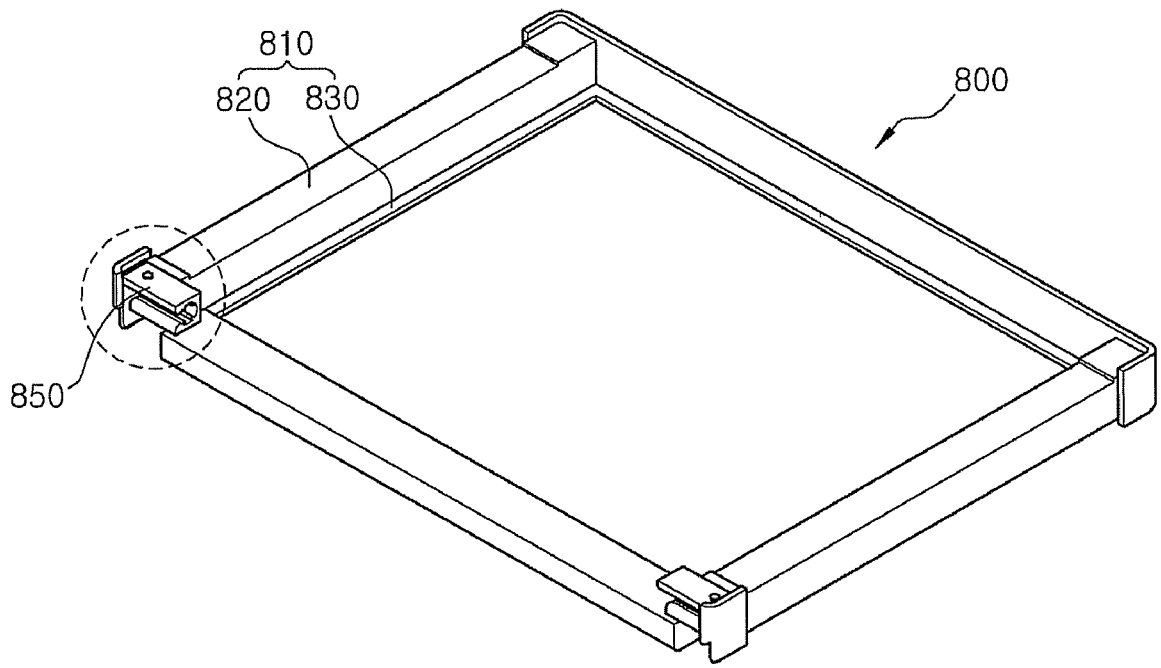
FIG. 1 is a schematic perspective view of an exemplary embodiment of a mold frame according to the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below", "lower", "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" or "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in detail with reference to the accompanying drawings.

FIG. 1 is a schematic perspective view of an exemplary embodiment of a mold frame according to the present invention.

Referring to FIG. 1, a mold frame 800 includes a receiving unit 810 having a predetermined receiving space therein and lamp holders 850 for holding a lamp.

The receiving unit 810, may have a substantially quadrangular frame shape with an open portion. The receiving unit 810 includes a plurality of sidewalls 820 and a receiving surface 830 protruding from the plurality of sidewalls 820 to extend inward, namely toward the receiving space.

A pair of lamp holders 850 for holding a lamp may be formed on any one of the plurality of sidewalls 820 or on the receiving surface. The lamp holder 850 and the receiving unit 810 may be integrally formed. When a mold frame is manufactured, the lamp holder may be attached to the mold frame to produce a lamp holder-integrated mold frame by injection molding, and the material of the lamp holder may be different from the mold frame. In exemplary embodiments, when a mold frame is manufactured, the lamp holder may be attached to the mold frame to produce a lamp holder-integrated mold frame by injection molding. As illustrated in the exemplary embodiment of FIG. 1, the pair of lamp holders 850 are formed integrally with the receiving unit 810 in order to hold a single lamp, but the present invention is not limited thereto. The sidewall on which the lamp holder 850 is formed to be lower (in a direction perpendicular to the receiving surface 830) than the other sidewalls since such a configuration allows easier access when the lamp is coupled to or separated from the lamp holder. The configuration of the lamp holder 850 will be described in more detail below.

Figure 2A:
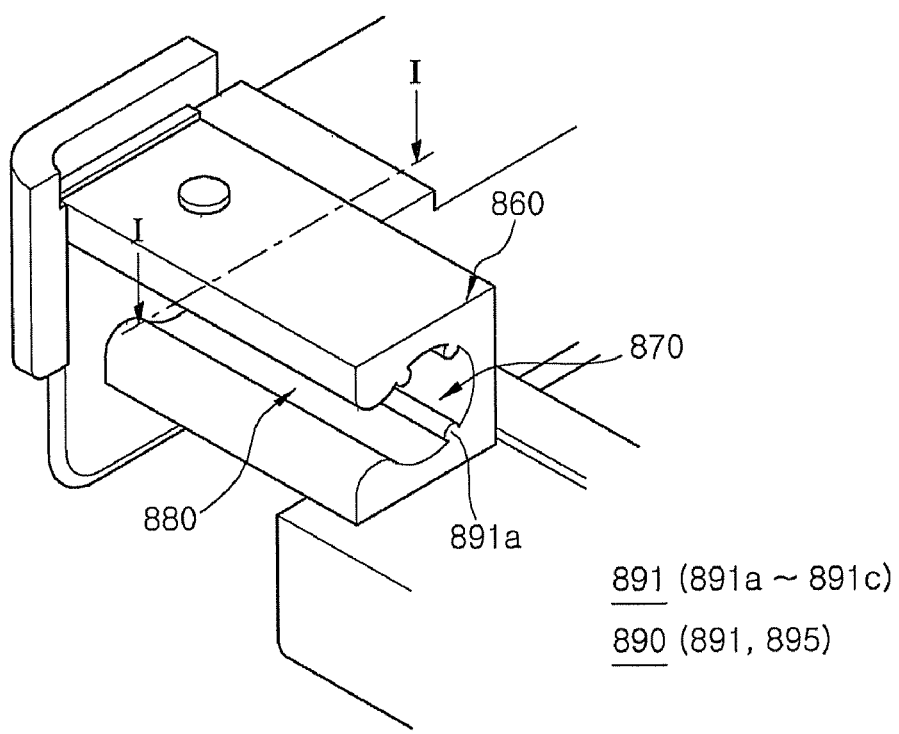
FIG. 2A is a partial enlarged perspective view of the mold frame shown in FIG. 1.
Figure 2B:
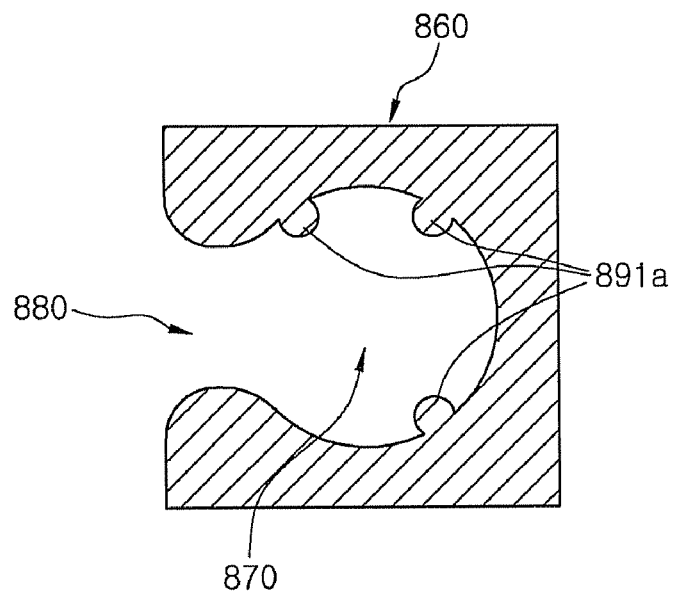
FIG. 2B is a schematic sectional view taken along line I-I of FIG. 2A.
Figure 3:
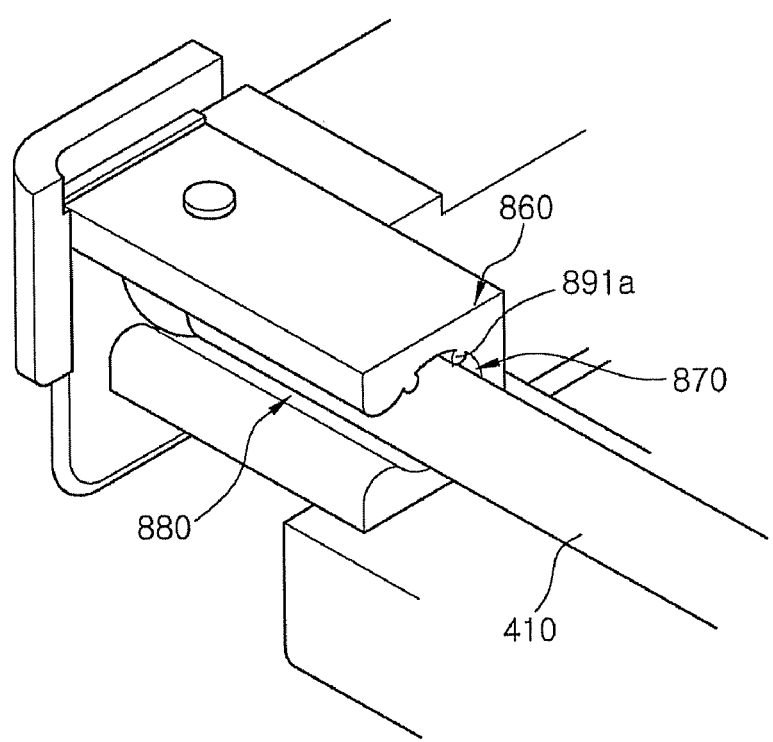
FIG. 3 is a view showing an exemplary embodiment of a lamp coupled to the mold frame of FIGS. 2A and 2B.

FIG. 2A is a partial enlarged perspective view of the mold frame shown in FIG. 1, FIG. 2B is a schematic sectional view taken along line I-I of FIG. 2A and FIG. 3 is a view showing an exemplary embodiment of a lamp coupled to the mold frame of FIGS. 2A and 2B.

Referring to FIGS. 2A, 2B and 3, each lamp holder 850 formed integrally with the receiving unit 810 of the mold frame includes a body 860, a hollow portion 870, an opening portion 880 and a concavo-convex portion 890. As shown in FIG. 1, the lamp holder 850 is formed to face each other at a side of the receiving unit 810 of the mold frame 800. At this time, since the pair of lamp holders have the same configuration, only one of the lamp holders will be discussed below.

The body 860 of the lamp holder has a substantially rectangular parallelepiped or cubic shape, but the body may have various shapes and not be limited to the above.

The hollow portion 870 is formed in the body 860 to have a predetermined space for receiving a lamp. The hollow portion 870 is formed inward from a first sidewall of the body 860 and may extend to a second sidewall facing the first sidewall. The pair of lamp holders are arranged to face each other and the hollow portion 870 formed in each lamp holder 850 is also formed in the first and the second sidewalls to face each other.

In exemplary embodiments, the hollow portion 870 is formed corresponding to a shape or profile of a lamp to be received in the lamp holder 850. As in the embodiment shown in FIG. 3, in a case where a cylindrical lamp 410 is received in and held to the lamp holder 850, the hollow portion 870 is formed in a cylindrical shape corresponding to the cylindrical lamp 410.

The opening portion 880 is formed in a sidewall of the body 860, such as in a sidewall adjacent to the sidewall in which the hollow portion 870 is formed, so as to be communicated with the hollow portion 870. The opening portion 880 serves as a hole or space used for inserting a lamp 410 into the hollow portion 870 of the lamp holder 850 or separating the lamp 410 therefrom. For ease of insertion or separation of a lamp 410, the opening portion 880 may be formed in an outside wall of the body 860, namely in a sidewall arranged opposite to the receiving space of the mold frame 800. In an exemplary embodiment, the opening portion 880 may be formed with a substantially smooth curve to facilitate insertion or separation of a lamp 410 from the lamp holder 850. In one exemplary embodiment, the opening portion 880 has a width narrower than the hollow portion 870 so as to improve a holding force after the lamp 410 is inserted therein, and the width of the opening portion may be less than or equal the thickness of the lamp.

The protruding concavo-convex portion 890 is formed within the body 860 in which the hollow portion 870 is formed. By forming the concavo-convex portion 890 within the body 860, a contact area between the lamp 410 and the body 860 of the lamp holder 850 is reduced.

As illustrated in FIGS. 2A, 2B and 3, the concavo-convex portion 890 has a projecting portion 891 protruding by a predetermined height taken substantially perpendicular from an inside surface of the body 860. The projecting portion 891 includes more than one protrusion, such as three linear protrusions 891a extending within the body 860 in the same direction as the longitudinal direction of the lamp 410. The linear protrusions 891a are arranged to be spaced from each other along the inside surface of the body 860 at predetermined intervals. As in the illustrated embodiment, the linear protrusion has a semicircular cross-section, but the cross-section is not limited thereto and may have a variety of shapes. In addition, the number of linear protrusions 891a is not limited to three, but the number and arrangement of the linear protrusions 891a may be variously changed.

As in the illustrated exemplary embodiment, if a contact area with a lamp is reduced by forming the projecting portion in the body of the lamp holder, it is possible to minimize heat generated in the lamp and transferred out of a backlight assembly, such as toward a LCD panel. Advantageously, the heat may be transferred through the lamp holder, whereby reducing or effectively preventing the heat transfer from the lamp from causing liquid crystal deterioration of the LCD panel.

In the illustrated embodiments of FIGS. 2A, 2B and 3, the mold frame 800 is configured such that the receiving unit 810 and the lamp holder 850 are integrally formed. In an exemplary embodiment, the mold frame 800 may be made of plastic material. In one exemplary embodiment, the mold frame 800 may include polycarbonate material with a low thermal conductivity. Polycarbonate has a thermal conductivity of about 0.02 W/mK, while silicon-rubber, a material of a conventional lamp holder, has a thermal conductivity of about 0.05 W/mK. The thermal conductivity of polycarbonate is lower than that of silicon-rubber which a conventional lamp holder is made of, by as much as about 40%. Since the thermal conductivity of polycarbonate is lower than that of silicon-rubber, it is possible to reduce or effectively prevent the local concentration of mercury, which occurs at a low temperature operation of a lamp and also to minimize that the heat generated in the lamp is transferred to the LCD panel through the lamp holder. Advantageously, it is possible to reduce or effectively prevent liquid crystal deterioration of the LCD panel caused from heat transfer from the lamp. Although polycarbonate has been illustrated as a material of the mold frame in this embodiment, it is just an example for better illustration, and the mold frame may be made of other plastic materials with low thermal conductivity.

Figure 4A:
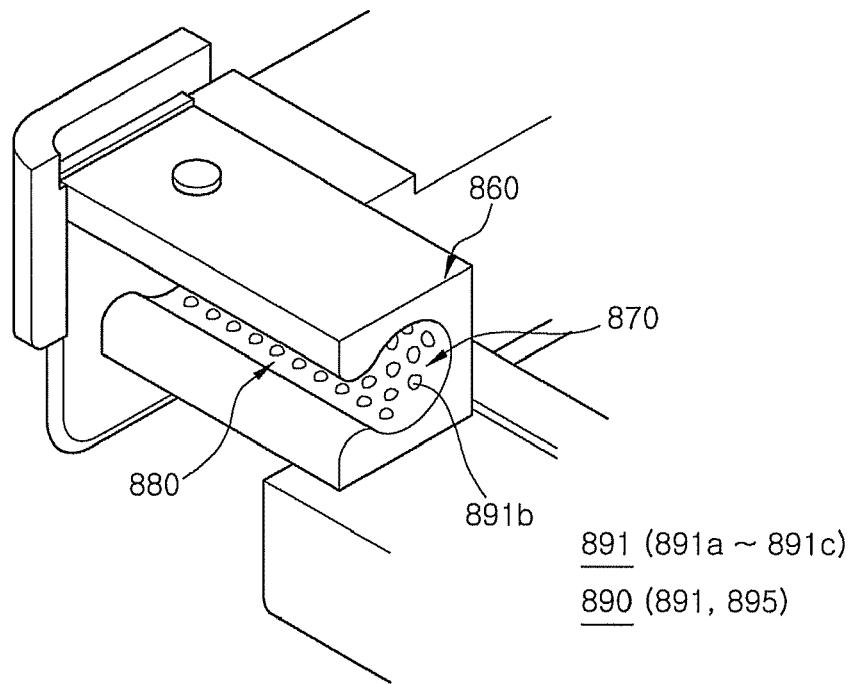
FIGS. 4A and 4B are schematic perspective views showing other exemplary embodiments of mold frames according to the present invention.
Figure 4B:
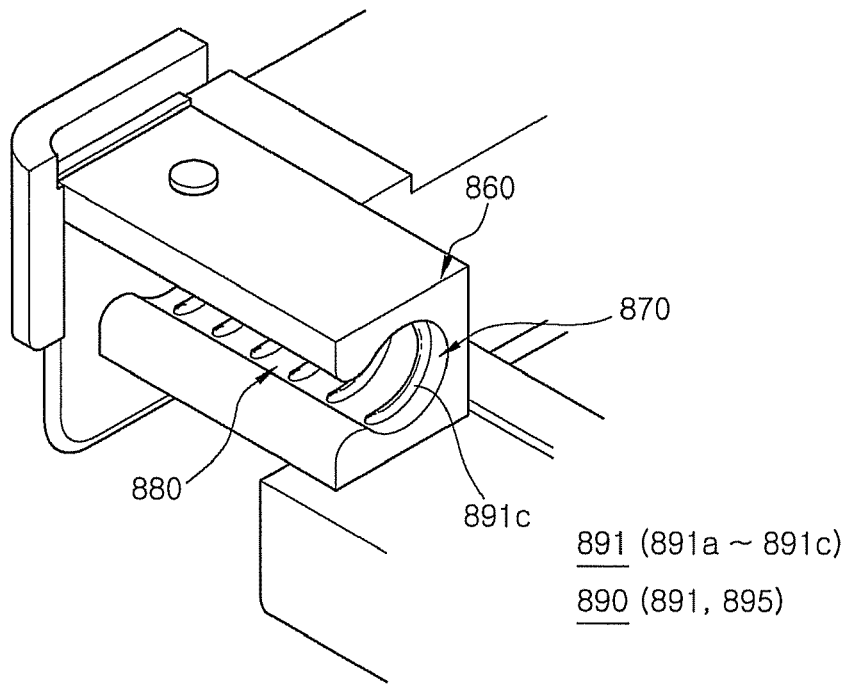

FIGS. 4A and 4B are schematic perspective views showing other exemplary embodiments of mold frames according to the present invention. The embodiments illustrated in FIGS. 4A and 4B are substantially similar to that of FIGS. 1-3, except for shape and arrangement of the concavo-convex portion 890 of the lamp holder. Thus, the following description will be focused on such differences.

Referring to FIGS. 4A and 4B, each lamp holder 850 formed integrally with the receiving unit 810 of the mold frame 800 includes a body 860, a hollow portion 870, an opening portion 880 and a concavo-convex portion 890. The concavo-convex portion 890 is formed within the body 860 in which the hollow portion 870 is formed. A lamp is supported by the concavo-convex portion 890, so that a contact area between the lamp and the lamp holder is reduced.

In the embodiment shown in FIG. 4A, the concavo-convex portion 890 has a projecting portion 891 protruding by a predetermined height from the inside surface of the body. At this time, the projecting portion 891 is composed of a plurality of discrete dot-shaped protrusions 891b, each of which is shaped substantially in a hemisphere. However, the number and arrangement of the dot-shaped protrusions 891b may be variously changed from the illustrated exemplary embodiment.

In the embodiment shown in FIG. 4B, the projecting portion 891 includes a plurality of linear protrusions 891c. The respective linear protrusions 891c are arranged to be spaced from each other at predetermined intervals in a longitudinal direction of the lamp holder 850 and extend along the circumference of the lamp in a transverse direction of the lamp. That is, each linear protrusion 891c has a shape corresponding to the inner circumference of the hollow portion 870 formed in the body 860, which may be considered as an annular shape. In exemplary embodiments, the transverse linear protrusion 891c may extend from one side of the opening portion 880 and along the inside surface of the body 860 to the other side of the opening portion 880. In an alternative exemplary embodiment, a number of transverse linear protrusions 891c may be extended along the inside surface of the body 860 from one side of the opening 880 to the other. In an alternative embodiment, the linear recess 891c may also be arranged to extend in an oblique direction.

Figure 5A:
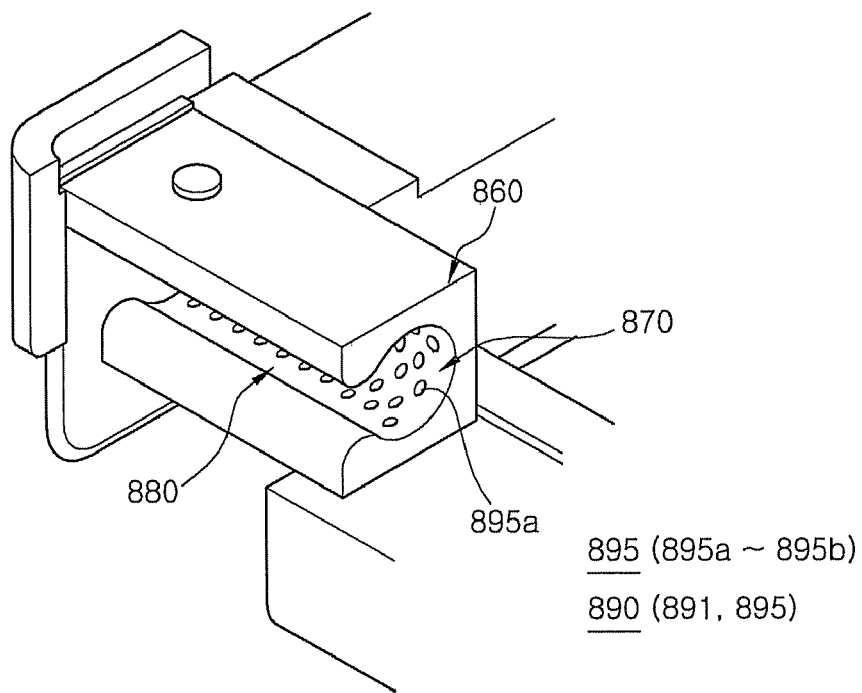
FIGS. 5A and 5B are schematic perspective views showing other exemplary embodiments of mold frames according to the present invention.
Figure 5B:
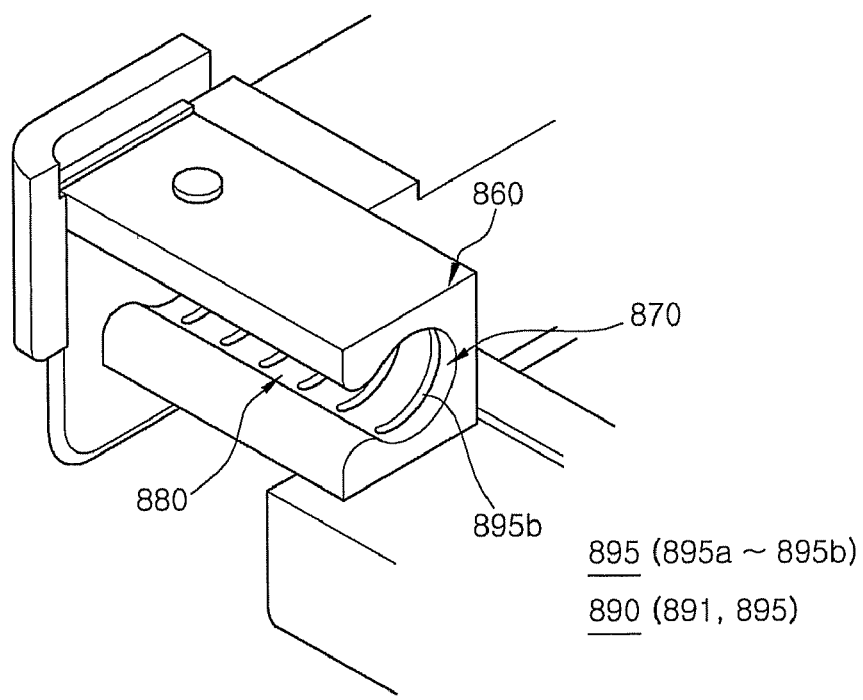

FIGS. 5A and 5B are schematic perspective views showing other exemplary embodiments of mold frames according to the present invention. The embodiments shown in FIGS. 5A and 5B are substantially similar to the embodiments in FIGS. 1-4B, except for shape and arrangement of the concavo-convex portion of the lamp holder. Thus, the following description will be focused on such differences.

Referring to FIGS. 5A and 5B, each lamp holder 850 formed integrally with the receiving unit 810 of the mold frame 800 includes a body 860, a hollow portion 870, an opening portion 880 and a concavo-convex portion 890. The concavo-convex portion 890 is formed within the body 860 in which the hollow portion 870 is formed. A recess portion 895 (895a, 895b) is formed in an inside surface of the body 860 by a predetermined depth. A lamp is supported and is partially in contact with the body 860, whereby a contact area between the lamp and the lamp holder is reduced.

In the embodiment shown in FIG. 5A, the concavo-convex portion 890 has the recess portion 895 depressed by a predetermined depth from the inside surface of the body 860. The recess portion 895 is composed of a plurality of dot-shaped recesses 895a, each of which is shaped in a hemisphere. However, the number and arrangement of the dot-shaped recesses 895a may be variously changed.

In the embodiment shown in FIG. 5B, the recess portion 895 is composed of a plurality of linear recesses 895b in the form of a groove. The linear recesses 895b are arranged to be spaced from each other at predetermined intervals in a longitudinal direction of the lamp holder 850 and extend along the circumference of the lamp in a transverse direction of the lamp. That is, each linear recess 895b has a shape corresponding to the inner circumference of the hollow portion 870 formed in the body 860, which may be considered an annular shape. In an alternative embodiment, the linear recess 895b may also be arranged to extend in the longitudinal direction of the lamp or in an oblique direction.

Figure 6A:
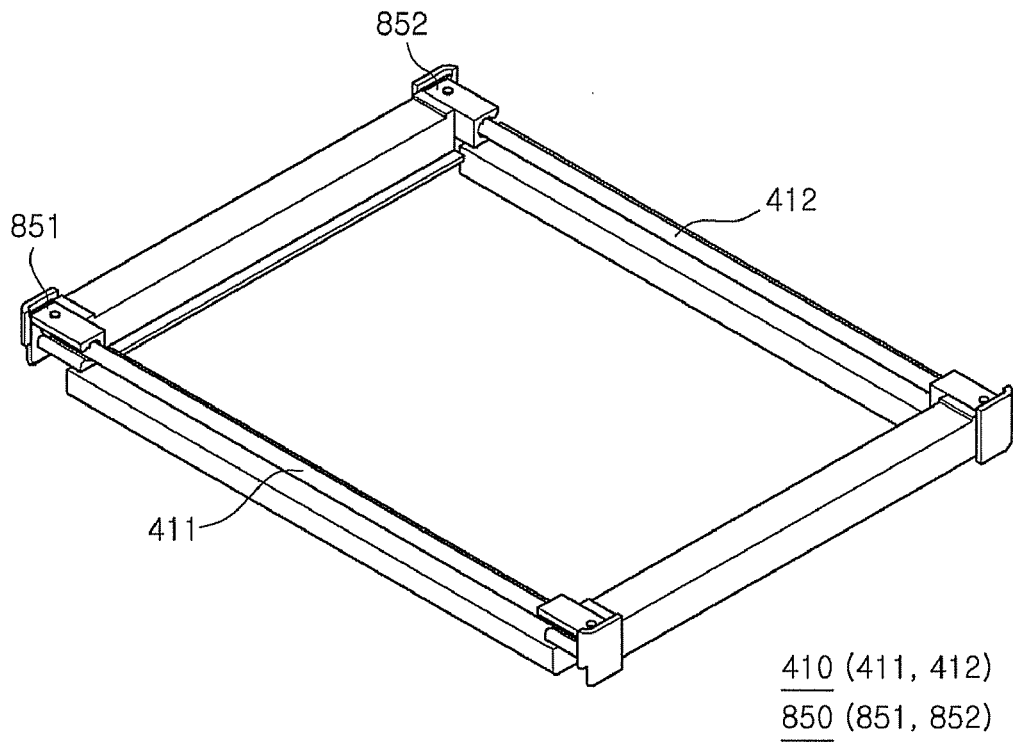
FIGS. 6A and 6B are schematic perspective views showing other exemplary embodiments of mold frames according to the present invention.
Figure 6B:
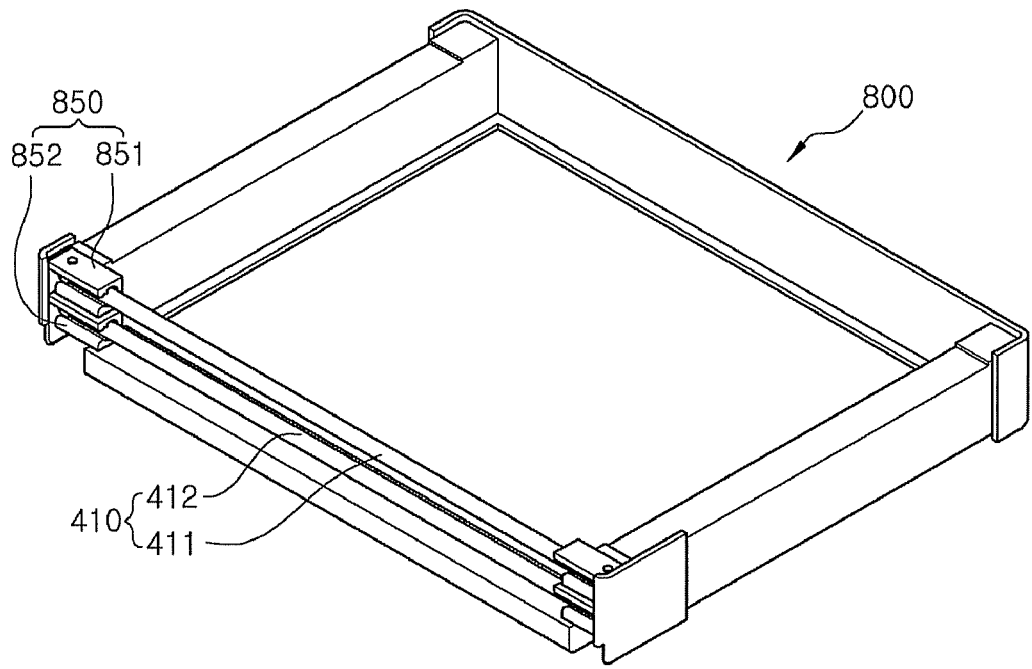

FIGS. 6A and 6B are schematic perspective views showing other exemplary embodiments of mold frames according to the present invention. The embodiments shown in FIGS. 6A and 6B are substantially similar to the embodiments in FIGS. 1-5B, except for the number and positions of lamp holders. Thus, the following description will be focused on such differences.

Referring to FIG. 6A, the lamp holder 850 is formed integrally with the receiving unit 810 of the mold frame 800. At this time, the lamp holder 850 includes first lamp holders 851 formed on a side of the receiving unit 810 and second lamp holders 852 formed on an opposing side of the receiving unit 810. The first and second lamp holders 851 and 852 are respectively provided in pairs of lamp holders 850 facing each other. Each lamp holder 851 and 852 includes a body, a hollow portion, an opening portion and a concavo-convex portion. A first lamp 411 is held to the first lamp holders 851 and a second lamp 412 is held to the second lamp holders 852. As illustrated in FIGS. 6A and 6B, the lamp holders are installed at both of opposite sides of the mold frame 800 respectively. However, it is not limited thereto, and the number of installed lamp holders may be changed variously. In one exemplary embodiment, the lamp holders may be installed to all of four sides of the mold frame.

Referring to FIG. 6B, the lamp holder 850 includes a first lamp holder 851 and a second lamp holder 852. The first and second lamp holders 851 and 852 are vertically stacked on a side of the receiving unit 810 of the mold frame 800. A first lamp 411 is held to the first lamp holders 851 and a second lamp 412 is held to the second lamp holders 852, respectively.

As in the illustrated embodiments, two pairs of the lamp holders may be formed on a side of the mold frame or a pair may be formed on each of both the sides. However, the present invention is not limited thereto, and the number and positions of the lamp holders may be changed in various ways. In one exemplary embodiment, the two pairs of the lamp holders are provided on one side of the mold frame and a pair of the lamp holders are provided on an opposite side.

Figure 7A:
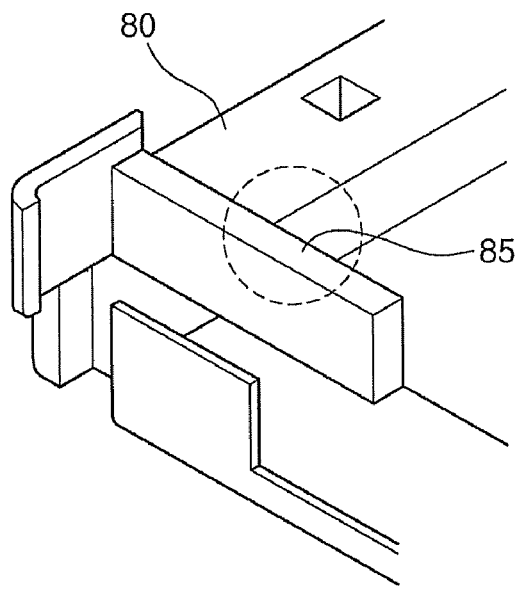
FIGS. 7A and 7B are views showing stress applying area effected to a conventional mold frame and an exemplary embodiment of a mold frame according to the present invention
Figure 7B:
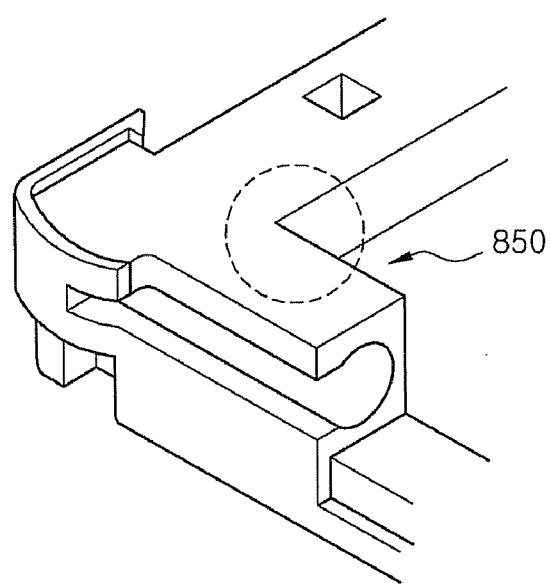

FIGS. 7A and 7B are views showing stress applying area effected to a conventional mold frame and the mold frame according to the present invention A conventional mold frame 80 shown in FIG. 7A is provided with a light guide plate ("LGP") stopper 85 for preventing the LGP from floating. A stress applied to the LGP stopper 85 at a portion of the lamp holder 850 indicated in the dotted line circle is 275 MPa at maximum. As a result, the mold frame is most seriously deformed near the LGP stopper.

On the contrary, in a case of a mold frame having the lamp holder 850 formed integrally therewith as shown in FIG. 7B, there is no LGP stopper separately installed thereto. A stress applied to the portion of the lamp holder 850 corresponding to a conventional LGP stopper (as indicated in the dotted line circle) is 162 MPa at maximum. Advantageously, the maximum stress applied to the same portion of the lamp holder 850 as in the illustrated embodiments is reduced by about 41% in comparison to the conventional mold frame 80, whereby it is possible to obtain an effect of greatly reducing deformation of the mold frame.

Figure 8A:
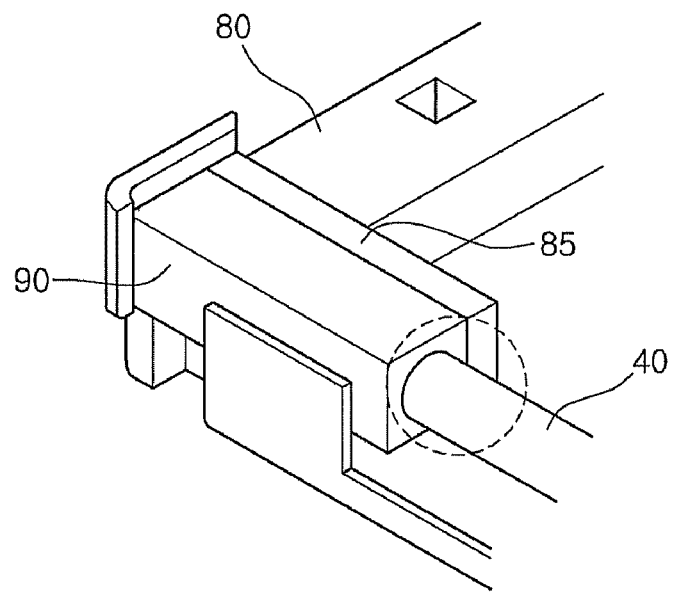
FIGS. 8A and 8B are views showing stress applying area effected to a lamp coupled to a conventional lamp holder and a lamp coupled to the mold frame according to the present invention.
Figure 8B:
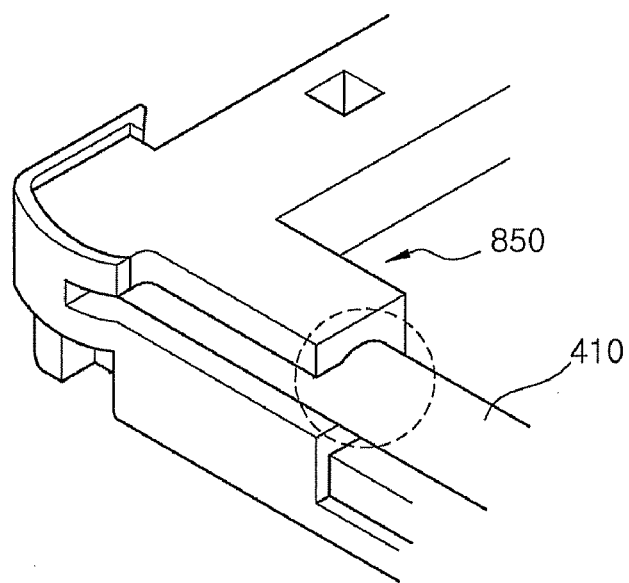

FIGS. 8A and 8B are views showing stress applying area effected to a lamp coupled to a conventional lamp holder and a lamp coupled to the mold frame according to the present invention A separate lamp holder 90 is arranged to a conventional mold frame 80 shown in FIG. 8A and a stress applied to a lamp 40 held by the lamp holder 90 at a portion indicated by the dotted line circle is 152 Mpa at maximum.

On the contrary, in a case of the mold frame having the lamp holder 850 formed integrally therewith as shown in FIG. 8B, a stress applied to a lamp 410 held by the lamp holder 850 is 117 MPa at maximum, so that a maximum stress applied to a lamp as in the illustrated embodiments is reduced by about 23% in comparison to the conventional one.

Figure 9:
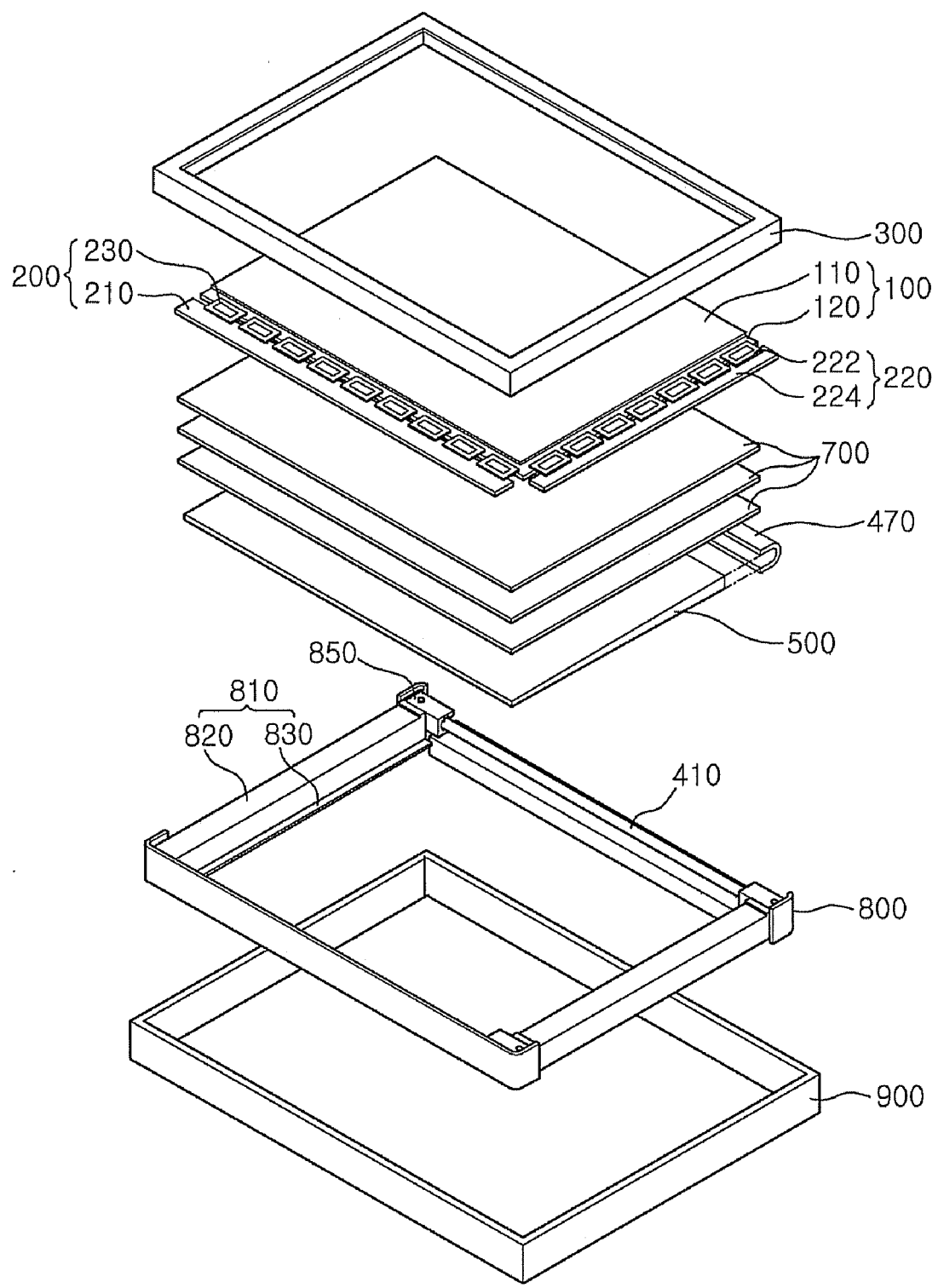
FIG. 9 is a schematic exploded perspective view of an exemplary embodiment of a liquid crystal display including the mold frame according to the present invention.

FIG. 9 is a schematic exploded perspective view of an exemplary embodiment of a liquid crystal display ("LCD") having the mold frame according to the present invention.

Referring to FIG. 9, the liquid crystal display includes an upper receiving container 300, an LCD panel 100, driving circuit units 200 and 220, a plurality of optical sheets 700, a lamp unit, a light guide plate 500, a mold frame 800 and a lower receiving container 900.

The LCD panel 100 includes a color filter substrate 110 and a thin film transistor ("TFT") substrate 120. The color filter substrate 110 is a substrate formed through a thin film forming process with an RGB (red, green blue) color filter that serves as a color pixel from which a predetermined color is produced while light passes through the pixel. The TFT substrate 120 is a transparent glass substrate on which TFTs are formed in a matrix pattern. Data lines are connected to source terminals of the TFTs, gate lines are connected to gate terminals thereof and pixel electrodes each including a transparent electrode made of a transparent conductive material are connected to drain terminals thereof. If electric signals are input to the data and gate lines, the respective TFTs are turned on or off such that the electrical signals required in the formation of pixels can be applied to the drain terminals. If electric power is applied to the gate and source terminals of the TFT substrate to turn on a TFT, an electric field is created between the pixel electrodes and the common electrodes of the color filter substrate. As a result, the liquid crystal injected between the TFT substrate and the color filter substrate changes their alignment, and thus, the light transmittance is also changed in accordance with the changed alignment, so that desired images can be obtained.

The driving circuit units 200 and 220 are connected to the LCD panel 100. The driving circuit units include a gate-side printed circuit board ("PCB") 224 equipped with a control integrated circuit ("IC") to apply a predetermined gate signal to the gate line of the TFT substrate 120, a data-side PCB 210 equipped with a control IC to apply a predetermined data signal to the data line of the TFT substrate 120, a gate-side flexible PCB 222 for connecting the TFT substrate 120 and the gate-side PCB 224, and a data-side flexible PCB 230 for connecting the TFT substrate 120 and the data-side PCB 210.

The upper receiving container 300 is formed into a substantially rectangular frame having a planar portion and sidewall portions bent perpendicular to each other, to prevent the LCD panel 100 and the driving circuit units 200 and 220 from being separated from the receiving container and to protect the LCD panel 100 and the driving circuit units 200 and 220 from external shock.

The lamp unit includes a lamp 410 and a lamp reflector 470. In exemplary embodiments, a cold cathode-ray tube type lamp is used as the lamp 410. However, the present invention is not limited thereto, and a variety of lamps may be employed in the present invention. In the illustrated exemplary embodiment, a cold cathode-ray tube type lamp is used as the lamp 410. The lamp 410 includes a lamp tube including a predetermined discharging gas and a phosphor layer, electrodes installed at both ends of the lamp tube and insulation portions for surrounding the respective electrodes. In addition, the lamp reflector 470 is disposed on one side of the lamp 410 to reflect light generated radially from the lamp 410 to a direction, i.e., toward an incident surface of the light guide plate 500, thus maximizing the efficiency of light utilization.

The light guide plate 500, which is coupled to the lamp reflector 470, converts the light distribution in the form of a linear light source generated from lamp unit into the light distribution in the form of a surface light source. A wedge-type plate or parallel flat plate can be used as the light guide plate 500. In an exemplary embodiment, a reflection plate (not shown) may be disposed below the light guide plate 500. A plate with high light reflectivity may be used as the reflection plate and installed such that it is brought into contact with a bottom surface of the lower receiving container 900. The optical sheet 700 is disposed over the light guide plate 500 to allow luminance distribution of the light emitted from the light guide plate 500 to be substantially uniform.

The mold frame 800 is generally shaped as a substantially rectangular frame with a receiving space formed therein. The light guide plate 500, the lamp unit and a plurality of optical sheets 700 are accommodated in the receiving space. As in the illustrated embodiments discussed above, the mold frame 800 includes the receiving unit 810 having a predetermined receiving space therein and the lamp holders 850 for holding a lamp. The receiving unit 810 is substantially shaped as a rectangular frame with an open portion and includes a plurality of sidewalls 820 and a receiving surface 830 protruding from the plurality of sidewalls 820 to extend inward, namely toward the receiving space. A pair of lamp holders 850 for holding a lamp is formed on an inside of one of the plurality of sidewalls 820 or on the receiving surface. As in the illustrated exemplary embodiments, the lamp holders 850 and the receiving unit 810 are integrally formed. When the lamp 410 is inserted in and coupled to the lamp holder 850 of the mold frame 800 and then the lamp reflector 470 is fixed, the process of coupling a lamp unit to the mold frame is completed. Thus, the assembling process is easy and the assembling time is shortened.

The lower receiving container 900 is coupled with the mold frame 800 to receive the aforementioned components in one place.

As in the illustrated exemplary embodiments, the mold frame with a lamp holder integrally formed therein and the liquid crystal display having the same are provided, so that it is possible to reduce unnecessary parts and thus manufacturing costs. Advantageously, the product assembling workability is improved, and the manufacturing procedure is simplified.

In exemplary embodiments, the impact resistance can be improved even without any additional part such as a light guide panel stopper. Moreover, since the lamp holder is made of plastic with a low thermal conductivity and a lamp is held by means of spot contacts, the thermal conduction of the heat generated from a lamp is lowered, thereby reducing or effectively preventing the local concentration of mercury in the lamp and deterioration of liquid crystal.

The mold frame with a lamp holder integrally formed therein and the liquid crystal display having the same according to the present invention as described above are merely illustrative embodiments. The present invention is not limited thereto, but it will be readily understood by those skilled in the art that various modifications and changes can be made thereto within the technical spirit and scope of the present invention as defined by the appended claims.

What is claimed is:

1. A mold frame comprising:
a receiving unit provided with a predetermined receiving space therein; and
a first pair of lamp holders formed on first side of the receiving unit and holding a lamp,
wherein
the receiving unit includes a plurality of sidewalls and a receiving surface protruding from the plurality of sidewalls to extend inward toward the receiving space;
each of the lamp holders includes:
a body protruded directly from a first sidewall of the plurality of sidewalls, such that the body forms a portion of a second sidewall connecting the first sidewalls to each other,
a hollow portion in the body and provided with a predetermined space receiving the lamp, and
an opening portion in the body and in communication with the hollow portion;
and
the receiving unit and the first pair of lamp holders are integrally formed.

2. The mold frame as claimed in claim 1, wherein the first pair of lamp holders are formed on a sidewall.

3. The mold frame as claimed in claim 1, wherein the first pair of lamp holders are formed on the receiving surface.

4. The mold frame as claimed in claim 1, further comprising a second pair of lamp holders formed on a second side of the receiving unit.

5. The mold frame as claimed in claim 1, wherein the opening portion is formed in a first sidewall of the body, wherein the first sidewall of the body faces a second sidewall of the body adjacent to the receiving space of the receiving unit.

6. The mold frame as claimed in claim 1, wherein a contact surface reducing member is formed on an inner surface of the body in which the hollow portion is formed.

7. The mold frame as claimed in claim 6, wherein the contact surface reducing member includes a protrusion protruding into the hollow portion from the inner surface.

8. The mold frame as claimed in claim 7, wherein the protrusion includes a plurality of dot-shaped protrusions formed in a predetermined pattern.

9. The mold frame as claimed in claim 7, wherein the protrusion includes a plurality of linear protrusions arranged to be spaced from each other in a predetermined direction.

10. The mold frame as claimed in claim 9, wherein the linear protrusions extend in a longitudinal direction of the lamp.

11. The mold frame as claimed in claim 1, wherein the width of the opening portion is less than or equal the thickness of the lamp.

12. The mold frame as claimed in claim 1, wherein the hollow portion is formed in a cylindrical shape.

13. The mold frame as claimed in claim 1, wherein the mold frame includes a plastic material with a low thermal conductivity.

14. A liquid crystal display, comprising:
a mold frame;
a lamp unit including a lamp; and
a liquid crystal display panel displaying images,
wherein the mold frame includes:
a receiving unit provided with a predetermined receiving space therein, and including a plurality of sidewalls and a receiving surface protruding from the plurality of sidewalls to extend inward toward the receiving space;
a first pair of lamp holders formed on a first side of the receiving unit and holding the lamp, each of the lamp holders including:
a body protruded directly from a first sidewall of the plurality of sidewalls, such that the body forms a portion of a second sidewall connecting the first sidewalls to each other;
a hollow portion in the body and provided with a predetermined space receiving the lamp, and
an opening portion in the body, in communication with the hollow portion;
wherein the receiving unit and the first pair of lamp holders are integrally formed.

15. The liquid crystal display as claimed in claim 14, further comprising:
a light guide plate disposed in the receiving space of the mold frame;
a plurality of optical sheets arranged over the light guide plate;
a reflection plate disposed below the light guide plate; and
a receiving container coupled to the mold frame.

16. The liquid crystal display as claimed in claim 14, wherein the lamp unit further includes a lamp reflector disposed at a side of the lamp and reflecting light generated from the lamp.

17. The liquid crystal display as claimed in claim 14, wherein the contact surface reducing member is formed on an inner surface of the body in which the hollow portion is formed.

18. The liquid crystal display as claimed in claim 14, wherein the lamp includes a lamp tube including a predetermined discharging gas and a phosphor layer, electrodes installed to both ends of the lamp tube, and insulation portions surrounding the respective electrodes.

19. The liquid crystal display as claimed in claim 14, further comprising a second pair of lamp holders formed on a second side of the receiving unit opposite to the first side, wherein a lamp is disposed in each pair of the lamp holders.

20. The liquid crystal display as claimed in claim 14, further comprising a second pair of lamp holders, wherein the first and second pair of lamp holders are formed on a same side of the receiving unit, the pairs of lamp holders being arranged vertically, a lamp being disposed in each pair of lamp holders.

21. A method for manufacturing backlight unit comprising:
   forming a mold frame, wherein the mold frame comprises:
      a receiving unit provided with a predetermined receiving space therein, and including a plurality of sidewalls and a receiving surface protruding from the plurality of sidewalls to extend inward toward the receiving space; and
      a first pair of lamp holders integrally formed on first side of the receiving unit and holding a lamp, each of the first pair of lamp holders includes:
         a body protruded directly from a first sidewall of the plurality of sidewalls, such that the body forms a portion of a second sidewall connecting the first sidewalls to each other,
         a hollow portion formed in the body and provided with a predetermined space receiving the lamp, and
         an opening portion formed in the body and communicating with the hollow portion; and
   inserting the lamp into the hollow portion.

* * * * *